May 8, 1956

G. W. BRUDERICK 2,744,515

DRESSING APPARATUS

Filed Aug. 14, 1952

INVENTOR.
GEORGE W. BRUDERICK
BY
ATTORNEY

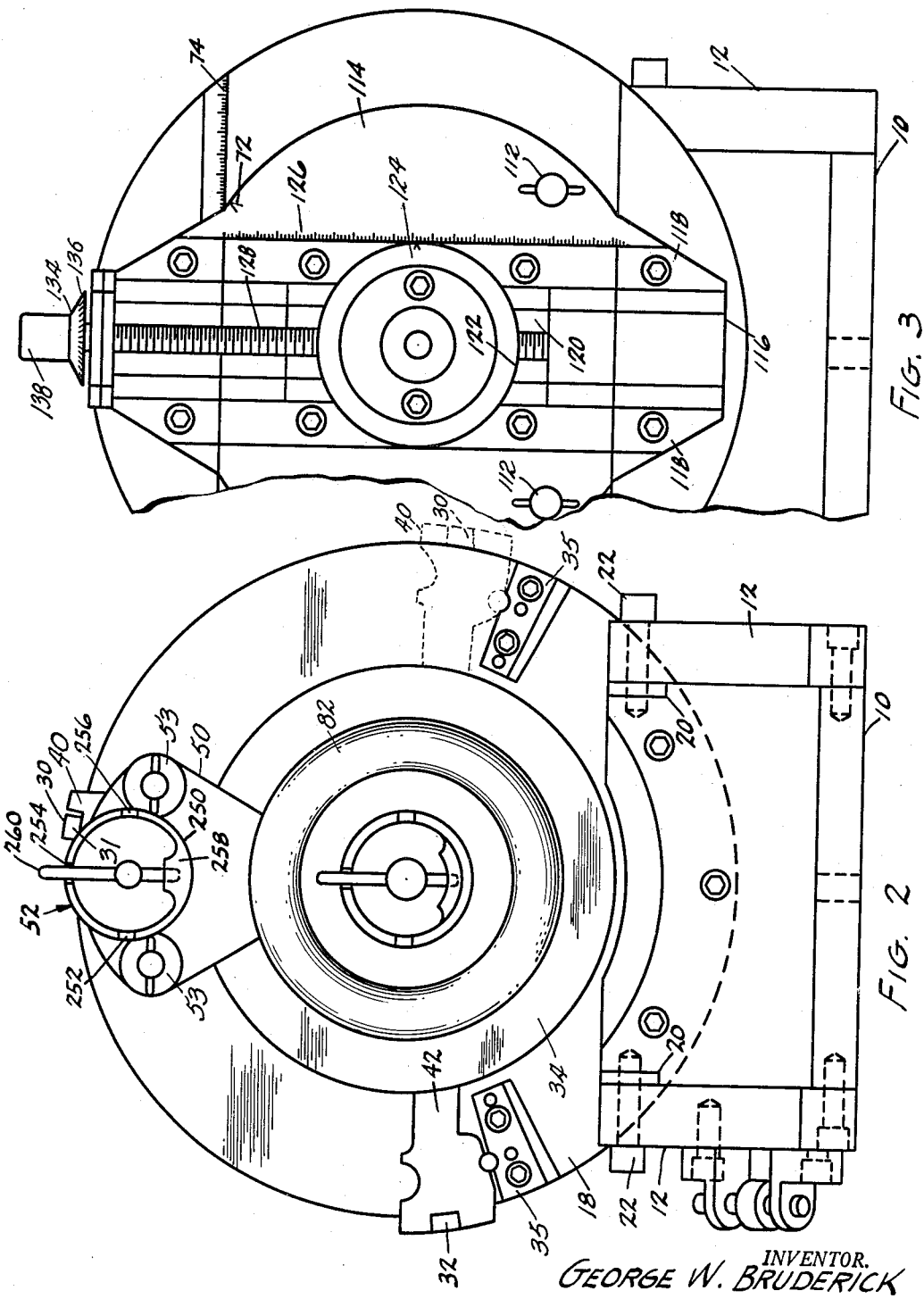

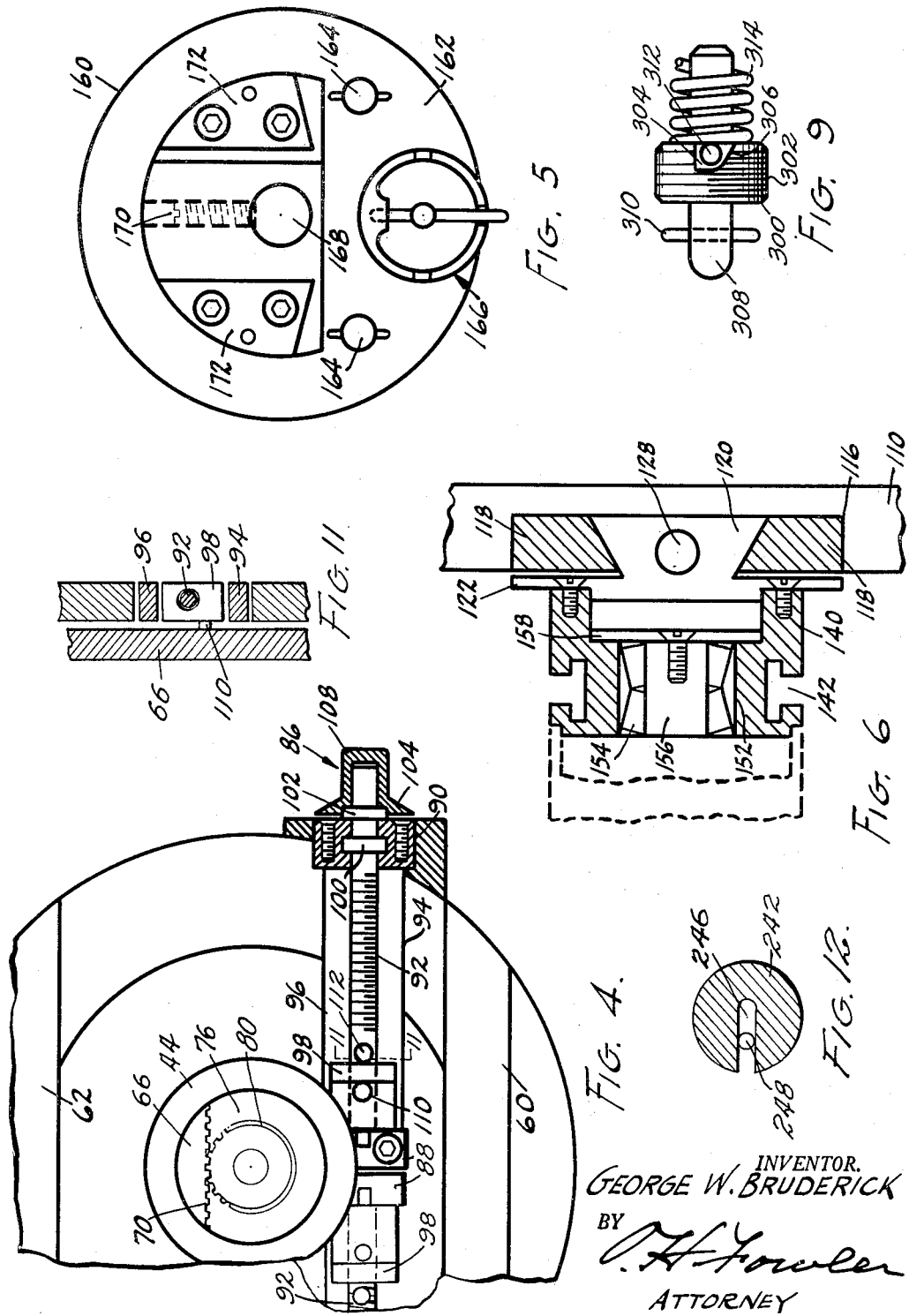

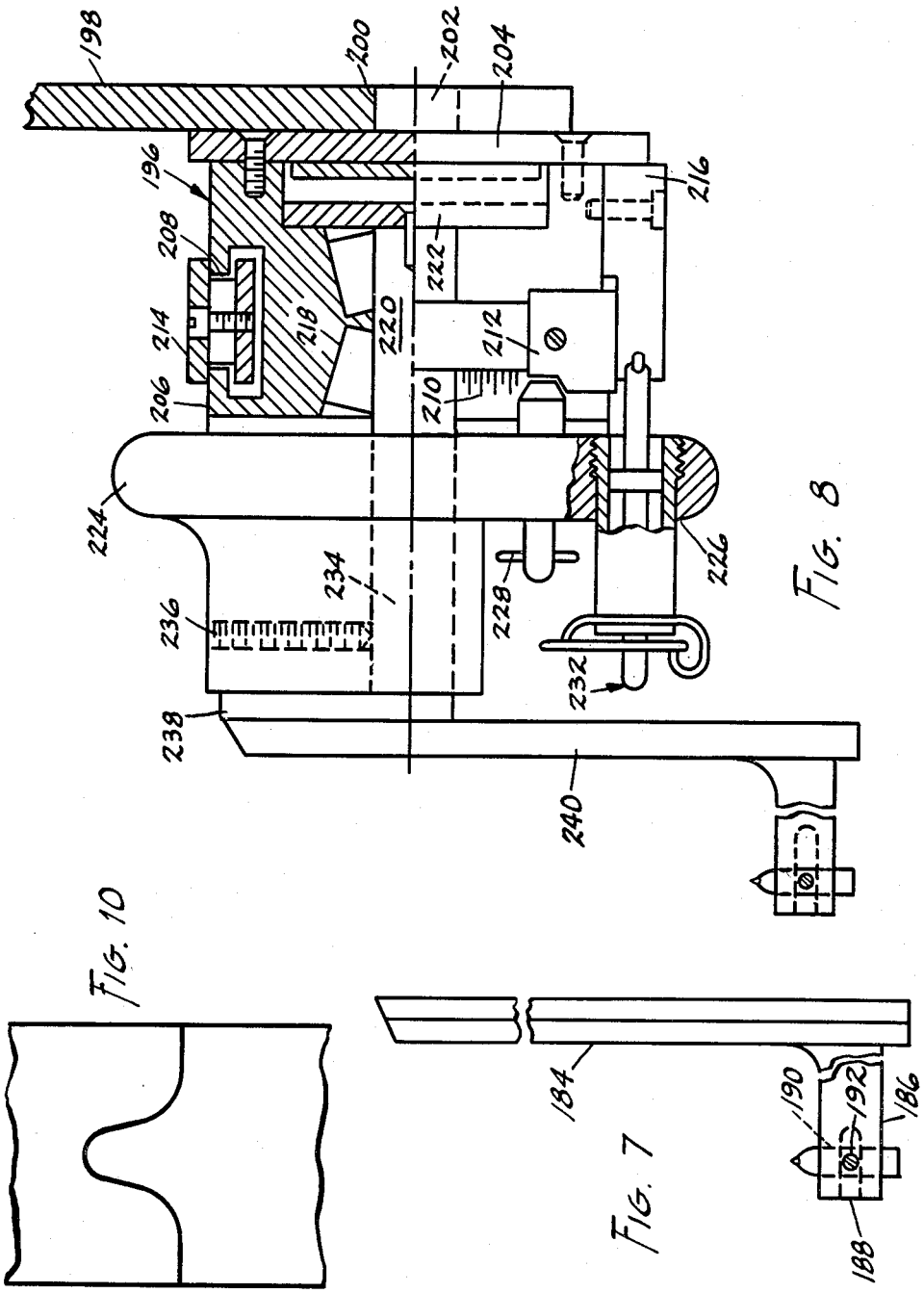

May 8, 1956     G. W. BRUDERICK     2,744,515
DRESSING APPARATUS
Filed Aug. 14, 1952     5 Sheets—Sheet 5
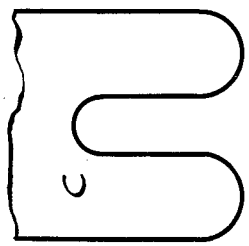
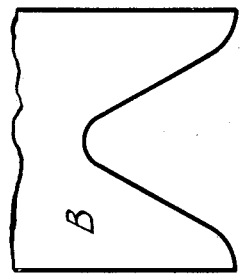
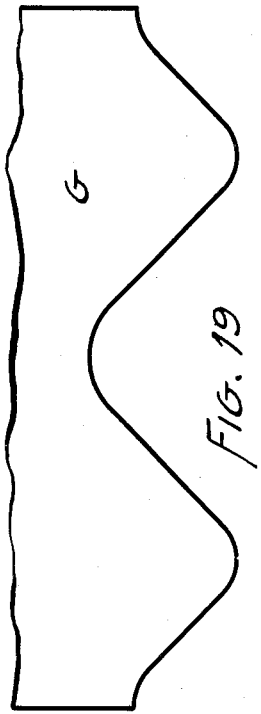
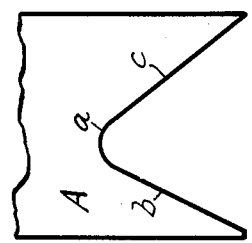
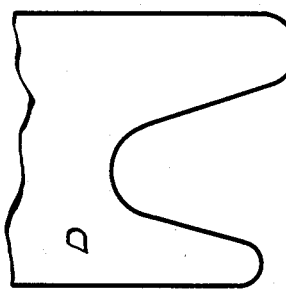
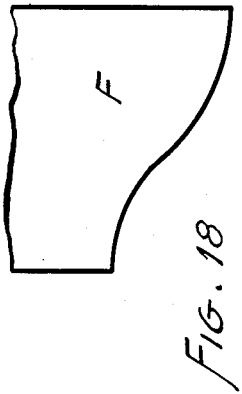
INVENTOR.
GEORGE W. BRUDERICK
BY
ATTORNEY

United States Patent Office 2,744,515
Patented May 8, 1956

2,744,515
DRESSING APPARATUS

George W. Bruderick, Detroit, Mich.

Application August 14, 1952, Serial No. 304,328

13 Claims. (Cl. 125—11)

This invention relates to grinders and more particularly to profile grinders.

Broadly the invention comprehends an apparatus highly useful as an attachment for surface grinding machines in the generation of any desired profile upon a grinding or finishing wheel. The apparatus is particularly useful as an attachment to any standard and/or conventional surface grinder in the production of precision pieces such as templates, dies, tools and other pieces wherein the work involved requires accuracy.

The structure of the apparatus is such as to hold a diamond point and to cause the same to travel in a predetermined path including desired angles and radii.

An object of the invention is to provide an apparatus and/or an accessory for a surface grinding machine for the generation of desired profiles.

Another object of the invention is to provide an attachment for surface grinding machines wherein a diamond point is held and caused to travel in a predetermined path which includes angles, radii and any combination thereof.

Another object of the invention is to provide an apparatus of the character hereinabove specified in which a diamond point is held and caused to travel in a predetermined path including angles and radii the relationship of one to another being exact.

A further object of the invention is to provide an apparatus of the class described which may be set to dress any selected group of angles and radii previous to cutting a wheel, and in which the actual cutting operation of the wheel is controlled by the operator.

A further object of the invention is to provide an apparatus of the class described capable of generating a greater range of angles and radii with greater accuracy.

A still further object of the invention is to provide an apparatus of the class described which is highly efficient in operation, and yet of marked simplicity as a whole and in respect to each of its component parts so that its manufacture may be economically facilitated both as regards to the parts and their assembly.

Other objects and advantages of the invention will appear from the following description when taken in connection with the accompanying drawings forming a part of this specification and in which:

Fig. 2 is a front elevation of the apparatus;

Fig. 3 is a cross-sectional view taken substantially on line 3—3, Fig. 1, with parts broken away;

Fig. 4 is a cross-sectional view taken on line 4—4 and with parts broken away;

Fig. 5 is an end view of the secondary drum;

Fig. 6 is a top plan view of the secondary drum;

Fig. 7 is a side elevation of a bracket;

Fig. 8 is an enlarged view of the tertiary drum;

Fig. 9 is an enlarged view of one of the small locking devices;

Figs. 10 and 13 to 19 illustrate different profiles which may be dressed on the apparatus;

Fig. 11 is a fragmentary view in section taken substantially on line 11—11, Fig. 4; and Fig. 12 is a sectional view taken substantially on line 12—12, Fig. 1.

Figure 1:
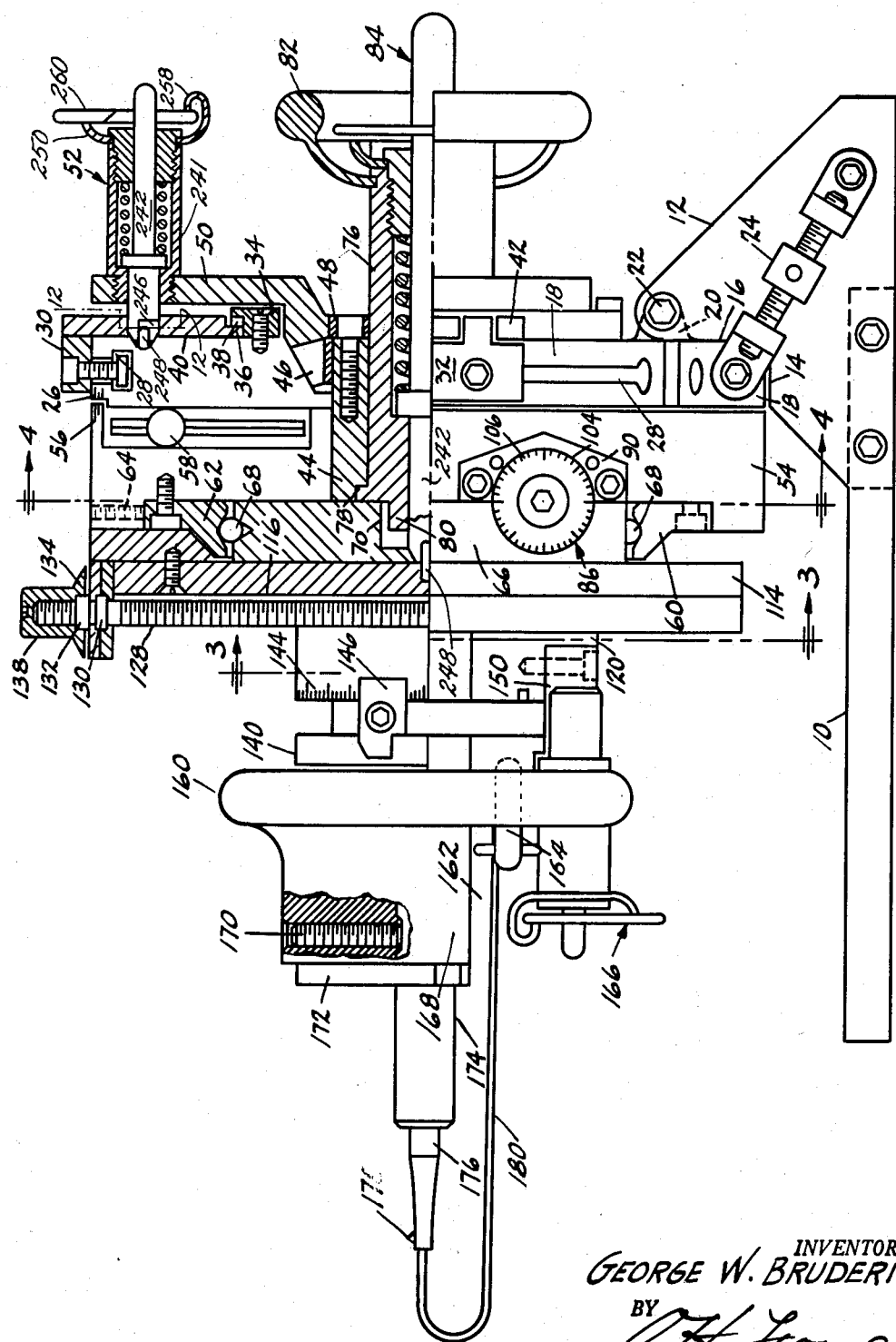
Fig. 1 is a side elevation partly in section of an apparatus embodying the invention.

Referring to the drawings for more specific details of the invention, 10 indicates a base which may be rigidly secured in position in any desirable manner. The base has spaced upwardly extended arms 12 provided with shoulders 14 having faces 16 normal to the base.

A support plate 18 preferably circular, has thereon spaced lugs 20 pivotally connected to the arms 12 as by studs 22. The support 18 is adjustably tiltable through an angle of ninety degrees by means of a turnbuckle 24 connected between the support 18 and one of the arms 12 so that the apparatus may be adjusted to a wheel to be dressed.

The support 18 has on its perimeter a vernier indicated at 26, and a slot 28 in the perimeter of the support receives a pair of slidably adjustable stops 30 and 32, and a ring 34 secured on the support in concentric relation thereto serves to sustain a pair of rings 36 and 38 for angular movement. The ring 36 has a radial bifurcated arm 40 receiving a lug 31 on the stop 30 and the ring 38 has a radial bifurcated arm 42 receiving a lug 33 on the stop 32 and spaced stops 35 secured on the support 18 limit movement of the arms.

The support plate 18 also has a concentrically disposed opening receiving a sleeve 44 with a tapered roller bearing 46 interposed for carrying the load, and the sleeve has secured thereto a ring 48 having thereon a radial arm 50 carrying a locking device indicated generally at 52 hereinafter described and auxiliary locking devices 53 also hereinafter described. The locking device is operative to lock the arm 50 to the support plate 18 and also to lock either of the arms 40 and 42 to the arm 50 by the locking devices 53.

A primary drum 54 press fitted on the sleeve 44 has on its perimeter a calibrated scale 56 for cooperation with the vernier 26 on the perimeter of the support 18, and interposed between the support 18 and the primary drum 54 is a thrust bearing 58 for the purpose of lending rigidity to the structure and yet providing for free easy movement of the primary drum.

Spaced gibs 60 and 62 are mounted on the primary drum 54 and are adjustable through the instrumentality of set screws 64, and a carrier 66 is slidably mounted between the gibs with suitable bearings 68 interposed. The carrier 66 has thereon a gear rack 70, the purpose of which will hereinafter appear, and the carrier 66 also has thereon a pointer 72 for cooperation with calibrations 74 on one of the gibs.

The sleeve 44 shown in Figs. 1 and 4, receives a hollow shaft 76 having a flange 78 seated on a shoulder on the inner end of the sleeve 44. This serves to retain the shaft against displacement. The shaft has thereon a pinion 80 in mesh with the gear rack 70 on the carrier 66, and a hand wheel 82 on the shaft serves to rotate the shaft so as to drive the pinion 80, and fitted in the hollow shaft 76 is a locking device for the carrier indicated generally at 84 and hereinafter explained.

Arranged on the primary drum in oppositely disposed relation are corresponding adjusters 86 only one of which is shown, each including spaced brackets 88 and 90 suitably secured to the primary drum 54 for the support of a screw 92 having mounted thereon for travel between suitable guides 94 and 96 a block 98. The screw has thereon a flange 100 for inhibiting axial thrust and another flange 102 supporting a ring 104 having thereon calibrations 106 and a cap 108 threaded on the screw serves to lock the ring 104 in adjusted position.

When the screw 92 is adjusted to engage the block 98 with a stop 110 on the carrier 66, the reading of the scale 74 is zero. When the screw 92 is adjusted to dress the face of an angle the block 98 travels on the screw and the screw is secured in adjusted position by a locking device 112 such as is shown in Fig. 9, and hereinafter described.

A plate 114 fixedly secured to the carrier 66 has a diametral slot 116 in which is arranged spaced corresponding gibs 118. A block 120 slidable between the gibs has a flange 122 and a vernier 124 on the flange cooperates with calibrations 126 arranged on the plate 114.

A screw 128 mounted for rotation on the block 114 has a circumferential flange 130 for inhibiting axial movement thereof and another circumferential flange 132 for the reception of a ring 134 having thereon calibrations 136 and a cap 138 threaded on the screw serves to hold the ring 134 in adjusted position.

A secondary drum 140 suitably secured to the block 120 has a circumferential T slot 142 and arranged on the circumferential face of the drum adjacent one edge thereof is a calibrated scale 144. The T slot 142 receives a pair of adjustable stops 146 and 148 and arranged on the drum between the adjustable stops is a fixed stop 150.

The secondary drum 140 has an axial bore having therein a tapered roller bearing 154 for the reception of a shaft 156 suitably held against displacement as by a plate 158 suitably secured to the shaft and abutting the drum, and an auxiliary drum 160 fixedly secured on the shaft 158 has a cutaway portion 162 on which is mounted corresponding spaced locking devices 164 of the type shown in Fig. 9 and hereinafter described and a locking device indicated generally at 166 also hereinafter described for cooperation with the stop 150. The stops 146 and 148 may be adjusted to control the degree of the secondary radius to be dressed and the locking devices 164 are adapted to engage the stops so as to retain them in adjusted position, and the locking device 166 determines the extent of the radius to be dressed, i. e., a full radius and/or a right or left portion thereof.

The auxiliary drum 160 illustrated in Figures 1 and 5 has an axial bore 168 and a set screw 170 enters the bore, and arranged on the face of the auxiliary drum are spaced gibs 172, the purpose of which will hereinafter appear. An adaptor 174 is fitted in the bore 168 and locked against displacement by the set screw 170. The adaptor receives a holder 176 for a diamond 178 and a support 180 connects the holder 176 to the drum 160.

The structure thus far described is capable of dressing a combination of three radii and two acute angles, i. e., two angles relatively close to one another, and when it is desired to dress a combination of radii and obtuse angles the adaptor 174, the holder 176 and the support 180 shown in Fig. 1 are removed and a bracket 184 shown in Fig. 7 is fitted between the gibs 172 and secured against displacement by tightening the gibs through the medium of conventional screws, as shown in Fig. 5. The bracket 184 has a round arm 186 provided with an axial bore 188 and a diametral bore 190 and a set screw 192 for locking a diamond holder in either of the bores.

When it becomes desirable to dress a combination of several radii and angles the adaptor 174 or the bracket 184 is removed from the auxiliary drum 160 and replaced by a fitting indicated generally at 196 and shown in Fig. 8. This fitting has substantially the same structure and characteristics as the secondary drum 140 and its associated parts. As shown, the fitting 196 includes a bracket 198 adapted to be adjustably supported between the gibs 172. The bracket has a bore 200 for the reception of a shaft 202 having a press fit in the bore. The shaft supports a plate 204 which in turn supports a tertiary drum 206 having a circumferential T slot 208 and arranged on the circumferential face of the drum adjacent the slot is a calibrated scale 210. The T slot 208 receives a pair of adjustable stops 212 and 214, and arranged on the drum between the adjustable stops is a fixed stop 216.

The tertiary drum 206 has an axial bore having therein a tapered roller bearing 218 for the reception of a shaft 220 held against displacement as by a plate 222 suitably secured to the shaft and abutting the drum, and an auxiliary drum 224 on the shaft 220 has a cutaway portion 226 on which is mounted corresponding spaced locking devices 228 only one of which is shown of the type illustrated in Fig. 9 hereunder described and another locking device indicated generally at 232 also hereinafter described cooperating with the fixed stop 216.

The stops 212 and 214 may be adjusted for the degree of the tertiary radius to be dressed and the locking devices 228 cooperate with the stops 212 and 214 to limit movement of the auxiliary drum 224 and the locking device 232 determines the extent of the radius to be dressed, that is, a full radius and/or a right or left portion thereof.

The auxiliary drum 224 has an axial bore 234 and a set screw 236 enters the bore and arranged on the face of the drum are spaced gibs 238 the purpose of which will hereinafter appear. In instances where it is desired to dress a small radius in combination with acute angles an adaptor corresponding to the adaptor 174 is inserted in the bore 234 and a diamond holder corresponding to the holder 176 is inserted in the adaptor and in instances where it is desired to dress a relatively large radius a bracket 240 corresponding to the bracket 184 is inserted between the gibs 238.

The locking devices indicated generally at 52, 84, 166 and 232 each include a sleeve 241 adapted to be threaded into a fixed member, and a spring pressed plunger 242 in the sleeve has in its forward end radial slot 246. The slot receives a pin 248 carried by the member to be locked. The sleeve has thereon a cup 250 provided with equispaced notches 252 and 254 and 256 and a lip 258 and a lever 260 extended diametrally through the plunger serves to rotate the plunger to effectively adjust the plunger for cooperation with the pin 248 in the member for positive locking the member for dressing either a right or left portion of a radius and/or a full radius. The lever also cooperates with the notches and lip for locking the plunger in adjusted position.

The locking device shown in Fig. 9 includes a short sleeve 300 leaving external threads 302 and a notch 304 in the wall of the sleeve has an inclined side wall 306. A plunger 308 movable in the sleeve has a hand lever 110 extended diametrally therethrough for manipulation of the plunger, and a radial pin 312 received by the notch 304 and a spring 314 wound on the plunger serves to retract the plunger. In use, upon pushing the plunger inwardly, the spring 314 is compressed whereupon the plunger is rotated by the hand lever 310 and during this movement the pin 312 rides over the inclined wall 306 onto the edge of the sleeve thereby retaining the plunger in locking position, and when it is desired to release the locking device the plunger is rotated in reverse direction to move the pin into the notch whereupon the spring 314 retracts the plunger.

In operation the structure as shown in Fig. 1 is capable of dressing a combination of one radius and two angles such as is shown in Fig. 11. In this instance the wheel to be dressed is adjusted to the diamond 178 to dress a combination of a ⅛ radius $a$, a 10° angle $b$ and a 20° angle $c$. As shown, the diamond 178 is held ⅛″ above the axis of the apparatus and accordingly needs no further adjustment. The adjustors 86 are regulated to move the blocks 98 outward to the maximum.

When viewed from the rear end of the apparatus, the stop 32 is then adjusted to 80 degrees on the left side of the calibration 56 and the stop 30 is adjusted to 70 degrees on the right side of the calibration 56. The locking device 52 is fully released and the arm 50 is accordingly free to swing between the stops 30 and 32 so as to dress the radius.

After dressing of the radius $a$ the arm 50 is swung to engage the plunger 242 of the locking device 52 with the arm 42 and securely held against displacement by one of the locking devices 53 received by a notch in the arm 42. The locking device 84 is then released and swung to the left and locked in position. Then upon swinging of the hand wheel 82 the pinion 80 in mesh with the gear rack 70 causes the plate 66 to reciprocate so as to dress the 10° angle $b$. Upon complete dressing of the 10° angle $b$, the carrier 66 is returned to centered position and the locking device 84 is turned to locked position and the locking device 52 swung against arm 40 and locked in position. The locking device 84 is then turned to the right and locked in position and the hand wheel 82 is turned so as to drive the pinion 78 in mesh with the gear rack 70 to reciprocate the block 66 so as to dress the 20° angle $c$. The angles may be varied by variation of the setting of the stops 30 and 32. It is of course to be understood that many other profiles can be dressed on the structure as shown in Fig. 1 by adjustment of the several instrumentalities illustrated and described, as for example the radii and angles shown in Figs. 10, 12 and 13.

In instances where it is desired to dress large radii and/or radii of 90° or more in combination with angles of 90° or more, in other words obtuse angles, the adaptor 174 and holder 176 are removed and replaced by the bracket 184 Figure 7. With this setup the apparatus is then adjusted as follows. The bracket 184 is adjusted through the medium of the gibs 172 so that the diamond 194 will be positioned approximately $9/16''$ below the axis of the secondary drum 140. The stop 148 is adjusted to 105° on the calibrations 144 and the stop 146 is adjusted to 125° on the calibrations 144. The screw 128 is then adjusted to move the diamond upwardly to a position $1\frac{1}{4}''$ above the axis of the primary drum which position will be indicated on the calibrations 124 and 134. The screw 92 of the adjustor 86 not shown, but arranged in oppositely disposed relation to the adjustor 86 shown in Fig. 4, is manipulated to move the stop 98 to a position of $5/8''$ from pin 110 so as to control the length of the angle $e$. Conversely the screw 92 of adjustor 86 is manipulated to move the stop 98 to a position of $3/4''$ from the pin 110 so as to control the extent of the angle $f$. The stop 30 is then set 35° according to vernier 26 and calibrations 56 to dress the degree of the angle $f$, and the stop 32 is set 15° according to the vernier 26 and calibrations 56 to dress the degree of the angle $e$.

With this setup the wheel to be dressed is adjusted to the diamond to dress a combination of radii and angles such as is shown in Fig. 15. In the required operation for this particular dressing the locking device 52 is completely released. The arm 52 is swung counterclockwise and locked in position against the stop 32 by one of the locking devices 53. The lock device 84 is released and swung counterclockwise position where it is held against movement. The hand wheel 82 is then swung counterclockwise to dress angle $e$ and locked in position by the locking device 84, as shown in Figs. 1 and 12. The locking device 166 is then released and moved to the left position where it is locked against displacement and the secondary drum 160 is turned clockwise to dress the radius. This completes the dressing of one half of the combination of radii and angles. The apparatus is then returned to its original position step by step wherein the locking devices 52, 84 and 166 are in completely locked position. Then the preceding repeated for the other side.

It is to be understood that other adjustments may be made to dress a great variety of radii and angles, and it is equally clear that adjustments may be made to dress a group of radii blended one to the other, as for example, to dress a wheel with a profile such as is shown in Fig. 16.

In instances where it is desired to dress a combination of many radii and angles such as is shown in Fig. 17, assuming that the structure shown in Figure 8 has been installed as hereinabove described the apparatus is adjusted in the following manner. The diamond point will be set approximately $3/8''$ above the axis of the shaft 202. The stops 212 and 214 are then set at 41°25' on the calibrated scale 210 and locked in position. The bracket 198 is then adjusted in the gibs 172 so that the diamond point will be approximately $5/8''$ below the axis of the secondary drum 140. The stops 146 and 148 on the secondary drum are then adjusted 41°25' on the calibration 144 and locked against displacement.

The screw 128 is then adjusted to elevate the diamond point approximately $1/2''$ above the axis of the primary drum 54. The adjustors are then set by turning the screws 92 so as to move the blocks 98 outwardly $1/2''$ each. The stops 30 and 32 on the support plate 18 are then each adjusted at 45° according to the calibrated scale 56. The apparatus is now completely set up for dressing a profile such as is shown in Fig. 17.

With this setup in a dressing operation, the wheel to be dressed is centered on the diamond point. The locking device 52 is moved counterclockwise into position and locked. The arm 50 is then moved against the stop 32 and locked, the locking device 84 is likewise moved counterclockwise and locked and the hand wheel 82 is turned counterclockwise until the pin 110 engages the block 98 and locked in position by the locking device 112. The locking device 166 is then moved counterclockwise into position and locked. The auxiliary drum 160 is then turned clockwise against the stop 146 and locked by the locking device 164. The locking device 232 is then released and turned clockwise into position and locked, and the auxiliary drum 224 is turned counterclockwise to complete the $3/8$ radius $e$. Retrace the settings step by step to center and reverse each of the settings to dress the profile including the angle $k$ and radius $m$.

While I have shown and described a specific profile that may be dressed, it is to be understood that the apparatus is capable of dressing a combination of various radii and angles.

Having thus described the invention, what I claim as new and desire to secure by Letters Patent is:

1. An apparatus of the class described comprising a base, a tiltable support thereon, a sleeve rotatable on the support, means for holding the sleeve against rotation, stops for limiting rotation and selecting the arc of rotation of the sleeve in either direction, a primary drum carried by the sleeve, a carrier shiftable diametrally on the primary drum, means for limiting movement of the carrier in either direction, means for shifting the carrier, a secondary drum shiftable on the carrier, an auxiliary drum supported for rotation on the secondary drum, adjustable stops for limiting rotation of the auxiliary drum in either direction, means for locking the auxiliary drum to the secondary drum, and means carried by the auxiliary drum for the support of a cutting tool.

2. An apparatus of the class described comprising a base, a tiltable support on the base, a sleeve rotatable on the support, means for locking the sleeve against movement, and for selecting the arc of rotation of the sleeve, a primary drum carried by the sleeve, a carrier shiftable diametrally on the primary drum, means for limiting movement of the carrier in either direction, manually actuated means for shifting the carrier, a screw mounted for rotation on the carrier diametrally of the primary drum, a secondary drum mounted for travel on the screw, an auxiliary drum supported for rotation on the secondary drum, cooperative means carried by the secondary drum and the auxiliary drum for limiting rotation of the auxiliary drum, and means carried by the auxiliary drum for support of a cutting tool.

3. An apparatus of the class described comprising a base, a support pivoted on the base, means for tilting the support, adjustable stops on the support, a sleeve supported for rotation axially of the support, means carried by the sleeve for rotating the sleeve, means cooperating with the stops for limiting rotation of the sleeve in either direction and for locking the sleeve to the support, a primary drum carried by the sleeve, means for indicating the angular relation of the primary drum to the support, a carrier shiftable diametrally on the primary drum, means for determining movement of the carrier in either direction, means for locking the adjustable means, manually actuated means for shifting the carrier, a screw mounted for rotation on the carrier, a secondary drum mounted for travel on the screw, means for indicating the position of the secondary drum, an auxiliary drum supported for rotation on the secondary drum in axial relation thereto, cooperative means carried by the secondary drum and the auxiliary drum for limiting rotation of the auxiliary drum in either direction, and means carried by the head for support of a cutting tool.

4. An apparatus of the class described comprising a base, a support pivotally mounted on the base, a turnbuckle connecting base and support, adjustable stops on the support, a sleeve supported for rotation concentrically in the support, an arm fixedly secured to the sleeve for rotating the sleeve, a locking device carried by the arm for holding the sleeve and cooperating with the stops for limiting rotation of the sleeve in either direction, a primary drum carried by the sleeve, means for indicating the relation of the primary drum to the support, a carrier shiftable diametrally on the primary drum, adjustors for limiting movement of the carrier in either direction, means for locking the adjustors, manually controlled means supported in the sleeve for shifting the carrier, a screw mounted for rotation transversely of and in normal relation to the carrier, a secondary drum mounted for travel on the screw, means for indicating the position of the secondary drum, stops on the secondary drum, an auxiliary drum supported on the secondary drum for rotation on an axis common to both drums, locking devices on the auxiliary drum cooperating with the stops for limiting rotation of the auxiliary drum in either direction and for locking the auxiliary drum to the secondary drum, means in the head for the support of a cutting tool and means on the auxiliary drum for support of the free end of the cutting tool.

5. An apparatus of the class described comprising a base, a tiltable support thereon, a sleeve rotatable on the support in axial relation thereto, means for rotating the sleeve, means for holding the sleeve against rotation, a primary drum carried by the sleeve, a carrier shiftable diametrally on the primary drum, means for shifting the carrier, means for holding the carrier against movement and for selecting the path of movement thereof, means for limiting movement of carrier in either direction of travel, a screw supported for rotation on the carrier, a secondary drum supported for travel on the screw, a shaft supported for rotation axially of the secondary drum, an auxiliary drum fixedly secured on the shaft, means for holding the auxiliary drum against rotation and for selecting zone of movement, means for limiting rotation in either direction and a cutting tool carried by the auxiliary drum.

6. An apparatus of the class described comprising a tiltable support, a sleeve rotatable thereon in axial relation thereto, means for holding the sleeve against rotation and for selectively determining zone of rotation thereof, a primary drum fixedly secured to the sleeve for rotation therewith, means for indicating angular adjustment between primary drum and the support, a carrier shiftable on the drum, manually actuated means for shifting the carrier, means for holding the carrier against movement and for selectively determining the zone of movement thereof, selective means for limiting movement of the carrier, means for indicating extent of movement of the carrier, a screw supported for rotation on the carrier transversely thereof and normal thereto, a secondary drum mounted for travel on the screw, means for indicating adjustment of the secondary drum, an auxiliary drum supported for rotation on the secondary drum, means for locking the auxiliary drum against rotation and for selecting the zone of rotation thereof, means for limiting rotation of the auxiliary drum in either direction, and a cutting tool carried by the auxiliary drum.

7. An apparatus of the class described comprising a tiltable support, a sleeve mounted for rotation axially thereof, means for holding the sleeve against movement and for selectively determining the zone of rotation of the sleeve, a primary drum fixedly secured to the sleeve, a carrier shiftable on the primary drum diametrally thereof, manual means for shifting the carrier, means for holding the carrier against movement and for selecting the zone of movement thereof, selective means for limiting movement of the carrier, a screw supported on the carrier, a secondary drum supported for travel on the screw, an auxiliary drum supported for rotation axially of the secondary drum, means for locking the auxiliary drum to the secondary drum and for selecting the zone of rotation thereof, means for limiting rotation of the auxiliary drum in either direction, and a cutting tool supported concentrically in the auxiliary drum.

8. An apparatus of the class described comprising a tiltable support, a sleeve mounted for rotation axially thereof, means for holding the sleeve against rotation and for selecting the zone of rotation thereof, a primary drum fixedly secured to the sleeve, a carrier shiftable on the primary drum, manual means for shifting the carrier, means for holding the carrier against movement and for selecting the zone of movement thereof, selective means for controlling degree of movement of the carrier, a screw supported on the carrier transversely thereof and in normal relation thereto, a secondary drum supported for travel on the screw, an auxiliary drum supported for rotation on the secondary drum, means for locking the auxiliary drum to the secondary drum and for selecting the zone of rotation thereof, means for limiting rotation of the auxiliary drum in either direction, a bracket supported on and movable diametrally of the auxiliary drum, an arm normal to the bracket, and a cutting tool supported on the arm.

9. An apparatus of the class described comprising a tiltable support, a sleeve mounted thereon for rotation axially thereof, means for holding the sleeve against rotation and for selecting the arc of rotation of the sleeve, a primary drum fixedly secured on the sleeve, a carrier shiftable diametrally on the primary drum diametrally thereof, manual means for shifting the carrier, means for holding the carrier against movement and selecting the path of movement of the carrier, selective means for determining the degree of movement of the carrier, a screw supported on the carrier transversely thereof and normal thereto, a secondary drum supported for travel on the screw, an auxiliary drum supported for rotation on the secondary drum, means for locking the auxiliary drum to the secondary drum and for selecting the arc of rotation thereof, a bracket supported on the auxiliary drum diametrally thereof, a tertiary drum supported on the bracket, an auxiliary drum supported for rotation on the tertiary drum, means for locking the last mentioned auxiliary drum to the drum and for selecting the arc of rotation thereof, and a cutting tool carried by the last mentioned drum.

10. An apparatus of the class described comprising a base, means for anchoring the base, a tiltable support on the base, a rotatable sleeve supported concentrically of the support, means for locking the sleeve against rotation and for selecting the arc of rotation thereof, a primary drum on the sleeve, a carrier shiftable diametrally of the primary drum, manual means for shifting the carrier, means for holding the carrier against movement and for selecting the path of movement thereof, selective means for the degree of movement of the carrier, a screw supported on the carrier transversely thereof and normal thereto, a secondary drum supported for travel on the screw, a rotatable auxiliary drum supported concentrically of the secondary drum, means for locking the auxiliary drum to the secondary drum and for selecting the zone of rotation thereof, a bracket adjustably supported diametrally on the auxiliary drum, a tertiary drum supported on the bracket, an auxiliary drum supported concentrically on the tertiary drum, means for locking the second mentioned auxiliary drum to the tertiary, and for selecting the arc of movement of the second mentioned auxiliary drum, a second bracket adjustably supported on the last mentioned drum diametrally thereof, and a cutting tool supported on the last mentioned bracket.

11. An apparatus of the class described comprising a base, a support mounted to swing thereon in a vertical plane, a sleeve mounted for rotation centrally of the support, an arm fixedly secured to the sleeve and extended therefrom in parallel relation to the support, a device carried by the arm for locking the arm against movement and for selecting movement in either direction, stops adjustable on the support for limiting movement of the arm, a primary drum fixedly secured to the sleeve for rotation therewith, a carrier shiftable diametrally on the drum, a rack on the carrier, a hollow shaft supported for rotation in the sleeve, a pinion on the shaft in mesh with the rack on the carrier, and a hand wheel for turning the shaft, a locking device in the shaft for holding the carrier and for selecting the path of movement of the carrier, adjusters for limiting movement of the carrier in either direction of movement, a screw supported for rotation on the carrier transversely thereof and normal thereto, a secondary drum mounted for travel on the screw, an auxiliary drum supported for rotation on the secondary drum, a locking device carried by the auxiliary drum and cooperating with a stop on the secondary drum for holding the auxiliary drum against movement and for selecting the arc of movement of the auxiliary drum, adjustable stops on the secondary drum, locking devices on the auxiliary drum cooperating with the stops on the secondary drum and a support for a cutting tool on the auxiliary drum.

12. An apparatus of the class described comprising a base, a support on the base tiltable in a vertical plane, a sleeve mounted for rotation concentrically of the support, an arm fixedly secured to the sleeve, a locking device carried by the arm, adjustable stops on the support for cooperation with the arm, a primary drum fixedly secured to the sleeve for rotation therewith, a carrier shiftable diametrally on the primary drum, a rack on the carrier, a hollow shaft supported for rotation in the sleeve, a pinion on the hollow shaft in mesh with the rack, a hand wheel on the hollow shaft, a locking device mounted in the hollow shaft for holding the carrier and for selecting the path of movement thereof, oppositely disposed adjusters on the primary drum for limiting movement of the carrier, a screw supported for rotation on the carrier transversely thereof and normal thereto, a secondary drum supported for travel on the screw, adjustable stops on the secondary drum, an auxiliary drum supported for rotation axially of the secondary drum, a locking device carried by an auxiliary drum cooperating with a fixed stop on the secondary drum and spaced locking devices on the auxiliary drum cooperating with the adjustable stops on the secondary drum, a bracket carried by and adjustable diametrally on the auxiliary drum, and a support for a cutting tool on the bracket.

13. An apparatus of the class described comprising a base, a support on the base tiltable in a vertical plane, stops adjustable on the perimeter of the support, stops movable on the face of the support for cooperating with the stops on the perimeter of the support, a sleeve supported for rotation concentrically of the support, an arm fixedly secured to the sleeve and adapted to cooperate with the stops for limiting rotation of the sleeve, a locking device carried by the arm for holding the sleeve against rotation and for selecting the arc of rotation of the sleeve, a primary drum secured to the sleeve for rotation therewith, a carrier shiftable diametrally of the primary drum, a rack on the carrier, a hollow shaft mounted for rotation in the sleeve, a pinion on the shaft received by the rack, a hand wheel on the shaft for rotation of the shaft, a locking device in the hollow shaft for holding the carrier against movement and for selecting the path of movement of the carrier, adjusters arranged in oppositely disposed relation on the support for limiting movement of the carrier, a screw mounted for rotation on the carrier transversely thereof and normal thereto, a secondary drum supported for travel on the screw, stops adjustable on the secondary drum, an auxiliary drum supported for rotation on the secondary drum in axial alignment therewith, a locking device on the auxiliary drum cooperating with a fixed stop on the secondary drum and spaced locking devices cooperating with the adjustable stops, a bracket adjustable on and diametrally of the auxiliary head, a tertiary drum supported thereon, a primary drum mounted on the tertiary drum for rotation relative thereto, a fixed stop and adjustable stops on the tertiary drum, locking devices carried by the primary drum for cooperation with the fixed and adjustable stops on the tertiary drum, a second bracket supported on the primary drum and a tool support on the bracket.

References Cited in the file of this patent

UNITED STATES PATENTS

| | | |
|---|---|---|
| 1,994,386 | Dardani | Mar. 12, 1935 |
| 2,404,465 | Statia | July 23, 1946 |
| 2,436,873 | Sneva | Mar. 2, 1948 |
| 2,458,768 | Dailey | Jan. 11, 1949 |

FOREIGN PATENTS

| | | |
|---|---|---|
| 117,201 | Australia | July 15, 1943 |
| 223,366 | Switzerland | Dec. 1, 1942 |